United States Patent [19]

Ohlenforst et al.

[11] Patent Number: 5,261,718
[45] Date of Patent: Nov. 16, 1993

[54] VEHICLE WINDOW

[75] Inventors: Hans Ohlenforst, Aachen; Gerd Cornils, Merzenich, both of Fed. Rep. of Germany

[73] Assignee: Saint Gobain Vitrage International, Courbevoie, France

[21] Appl. No.: 939,346

[22] Filed: Sep. 2, 1992

[30] Foreign Application Priority Data

Sep. 2, 1991 [DE] Fed. Rep. of Germany ....... 4129052

[51] Int. Cl.$^5$ .............................................. B60R 13/06
[52] U.S. Cl. ................... 296/96.21; 296/93; 296/201; 52/208
[58] Field of Search ...................... 296/96.21, 93, 201; 52/208, 400

[56] References Cited

U.S. PATENT DOCUMENTS

| | | | |
|---|---|---|---|
| 4,551,372 | 11/1985 | Kunert | 428/38 |
| 4,562,676 | 1/1986 | Kruschwitz | 52/208 |
| 4,571,278 | 2/1986 | Kunert | 156/108 |
| 4,591,203 | 5/1986 | Furman | 296/201 |
| 4,765,673 | 8/1988 | Frabotta et al. | 296/93 |
| 4,879,853 | 11/1989 | Braendle et al. | 52/208 |
| 4,938,521 | 7/1990 | Kunert | 296/96.21 |
| 4,986,867 | 1/1991 | Braendle et al. | 156/244 |
| 4,994,315 | 2/1991 | Schreiber et al. | 296/93 X |
| 5,057,265 | 10/1991 | Kunert et al. | 264/511 |

FOREIGN PATENT DOCUMENTS

| | | |
|---|---|---|
| 0307317 | 9/1988 | European Pat. Off. . |
| 0312496 | 4/1989 | European Pat. Off. . |
| 3232781 | 3/1984 | Fed. Rep. of Germany . |
| 3319682 | 12/1984 | Fed. Rep. of Germany . |
| 9013766.3 | 1/1991 | Fed. Rep. of Germany . |

*Primary Examiner*—Robert R. Song
*Attorney, Agent, or Firm*—Pennie & Edmonds

[57] ABSTRACT

A vehicle window with a glass plate (1) bonded to the mounting flange (8) of the window frame is characterized in that to the glass plate (1) is connected a frame-like profile strand (4) made from a polymer, which cooperates with the edge (7) of the mounting flange (8). The part of the frame-like profile strand (4) cooperating with the edge (7) of the mounting flange (8) is arranged on the surface of the glass plate (i) directed towards the outside of the vehicle and the glass plate (1) is bonded to the mounting flange (8) on its side directed towards the interior of the vehicle.

10 Claims, 2 Drawing Sheets

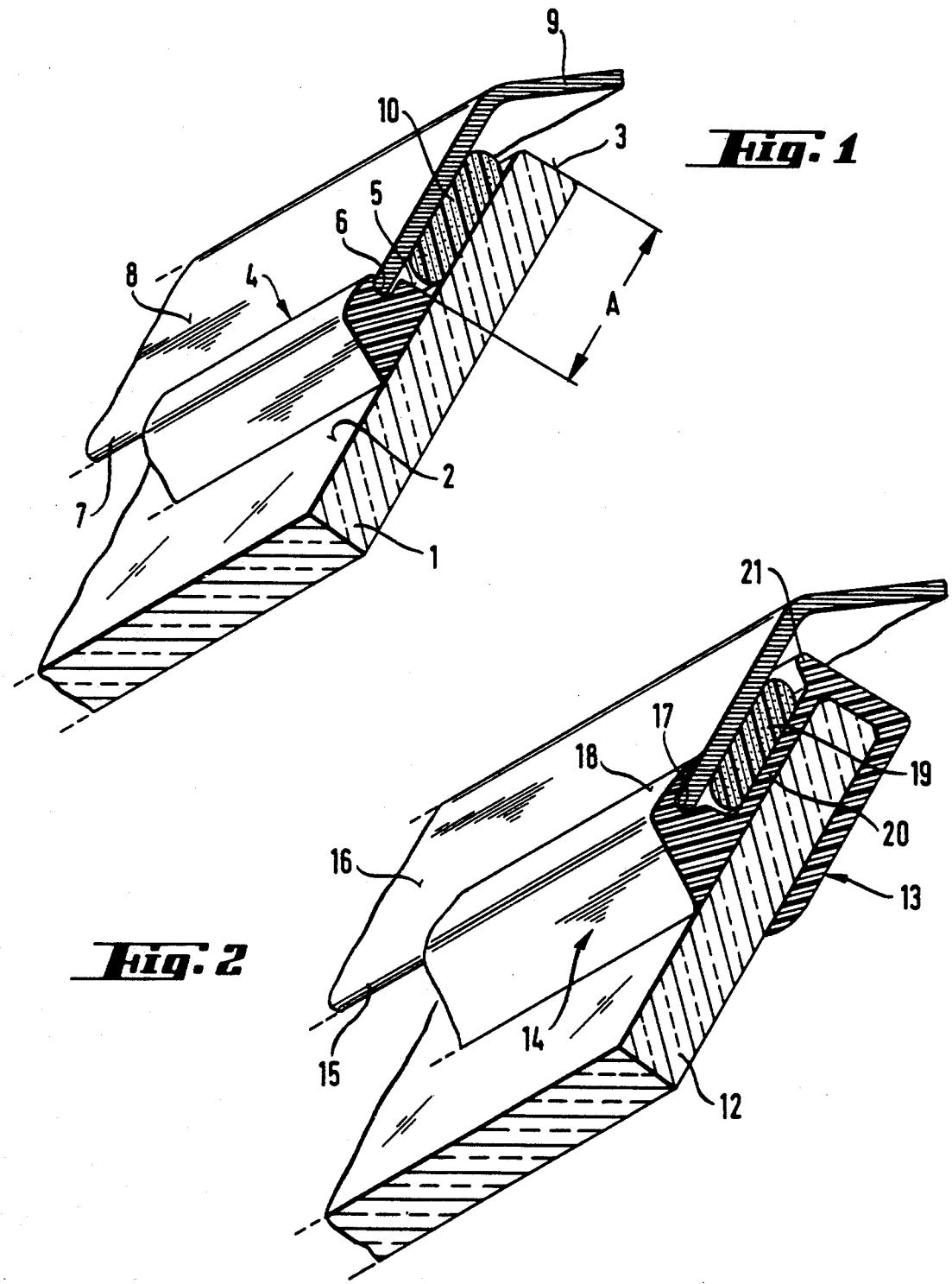

VEHICLE WINDOW

FIELD OF THE INVENTION

The invention relates to a vehicle window with a mounting flange forming part of the window frame of the vehicle body and a glass plate bonded to the mounting flange by means of an adhesive strand and which is provided with a polymer frame or frame-like profile cooperating with the mounting flange.

BACKGROUND OF THE INVENTION

A vehicle window with these features is e.g. known from EP 307 317 B1. In the case of the known vehicle window the glass plate is inserted in the window frame from the outside of the vehicle body. The frame-like profile strip cooperating with the mounting flange is located on the side of the glass plate directed towards the vehicle interior and has a projecting part, which engages over the inner edge of the mounting flange directed towards the window opening. Outside this part engaging over the mounting flange, i.e. between the same and the circumferential edge of the glass plate, is located the adhesive strand or ribbon. In order to protect the adhesive material against UV-rays, which lead to an embrittlement of the adhesive, on the glass plate side directed towards the mounting flange is provided an opaque, frame-like enamel coating. This frame-like coating also serves to make it impossible to see the adhesive area from the outside through the glass plate.

The vehicle window according to the invention differs from the known vehicle windows in that the part of the frame or frame-like profile strand cooperating with the mounting flange, as well as the adhesive strand are located on the glass plate surface directed towards the outside of the vehicle body and the glass plate is bonded to the mounting flange side directed towards the vehicle interior, the adhesive strand being located on the side of the profile frame or frame-like profile strand cooperating with the mounting flange.

The inventive construction of a vehicle window leads to a number of important advantages compared with the known vehicle windows. Firstly there is no need to provide a coating on the glass plate preventing the passage of UV-rays because this function is fulfilled in the case of the window according to the invention by the actual mounting flange. This not only brings about a significant simplification in the manufacturing process of the glass plates, but also leads to an improvement in the protective action, because the conventional printed enamel protective coatings do not always provide an absolute protection against UV-radiation. It is also advantageous that the outermost marginal area of the glass plate which, due to the glass plate manufacturing process, often has minor deformations, which are still visible to the critical eye, is now covered from the outside by the mounting flange and is consequently no longer visible. This makes it possible to use for the manufacture of glass plates production methods, which necessarily lead to greater marginal deformations, but which lead to advantages, in particular, of economic nature. As the edge of the glass plate, i.e. its circumferential surface, is located in the vehicle interior and can be covered by the vehicle interior panelling, there is also no need for the grinding smooth or polishing of the circumferential surfaces. Moreover, unlike in the case of conventional fitting methods, the size of the glass plates is less critical, so that it is possible to increase the tolerance range with respect to the plate size, which can in turn lead to economic advantages. Finally, it is possible in the case of the fitting method according to the invention, to provide the glass plates on the inside with a transparent conductive coating serving as an antenna, without disadvantageously influencing the function of said coating, as in the known vehicle windows with an internal, electrical conductive coating, by the adhesive producing the connection to the metal flange.

SUMMARY OF THE INVENTION

The fitting technique of the invention may be used with any type of vehicle glazing: monolithic, laminated or even innerly coated with plastic sheets. With this type of glazing, the so-called "bilayer glazing", the fitting method according to the invention allows a direct adhesion between the glass and the mounting flange which is a well-known problem and avoids the question of an adhesion with the plastic side of the glazing.

BRIEF DESCRIPTION OF THE DRAWINGS

Appropriate further developments of the invention can be gathered from the subclaims and the following description of various embodiments relative to the drawings. In the form of a vertical section in the upper marginal area of the window, the drawings show:

FIG. 1 A vehicle window according to the invention in its simplest construction.

FIG. 2 A vehicle window with a monolithio glass plate and a cross-sectionally U-shaped frame surrounding the border of the glass plate.

DETAILED DESCRIPTION OF THE DRAWINGS

Figure 3:
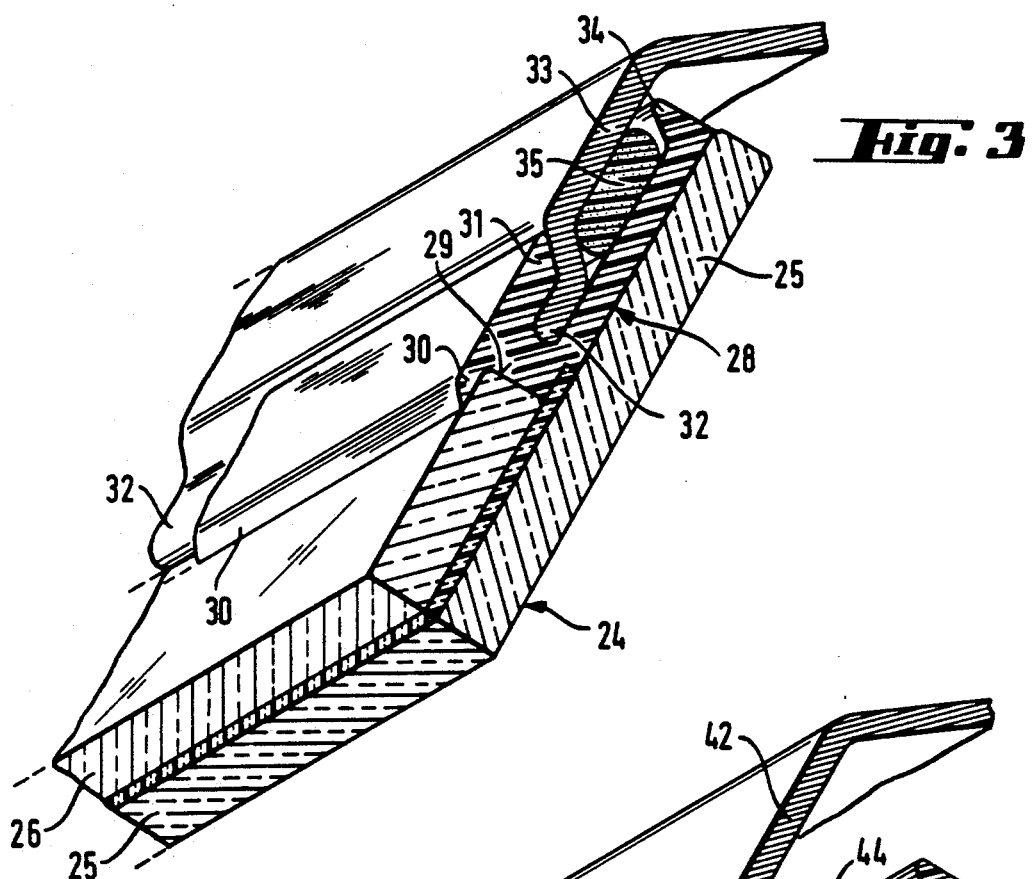
FIG. 3 A vehicle window with a laminated glass plate constructed in stepped manner and a profile frame adhering on one side to the glass plate.

In the embodiment shown in FIG. 1, the vehicle window is provided with a monolithic glass plate 1 made from heat-tempered safety glass. Instead the glass plate 1 can obviously be constituted by a multilayer safety glass plate such as laminated glass or innerly plastic sheeted glass. On the outwardly directed surface 2 of the glass plate 1 a profile strand 4 is arranged parallel to the circumferential surface 3 with a spacing A. The profile strand 4 is bonded in fixed, durable manner to the glass surface.

The profile strand 4 is produced directly on the glass surface by the extrusion of an appropriate, extrudable polymer adhering to the glass plate. This extrusion technology and suitable polymer materials are known. Particularly suitable are single-component polyurethane prepolymers in pasty from which, after extrusion and under the influence of atmospheric humidity, harden completely to high modulus elastomers. Such polyurethane systems are described in U.S. Pat. No. 3,779,794. It is also possible to use corresponding two-component polyurethane systems, e.g. adhesive systems, as described in European patent application 83 797 or European patent 24 501. It is also possible to use thermoplastic elastomers, e.g. certain types of the SANTOPRENE product produced by Monsanto. As a function of the adhesive material used, appropriate pretreatment takes place to the glass surface which is provided with a corresponding coupling agent coating and on which the polymer strand is extruded with the aid of a suitable extrusion die.

Extrusion of the profile strand 4 takes place with the aid of an extrusion head having the extrusion die, the extruder head being moved with the aid of a correspondingly programmed robot or some other program-controlled machine along the border of the glass plate at a constant distance from the circumferential surface 3.

The profile strand 4, which can fundamentally have any cross-section, is provided on its surface 5 directed against the circumferential edge 3 of the glass plate 1 with a locking groove 6, in which engages the edge 7 of the mounting flange 8, which forms part of the window frame. In the represented embodiment the mounting flange 8 is part of the outer skin 9 of the vehicle body. However, instead, it is also possible for it to be part of the window frame independent of the outer skin.

On fitting the glass plate into the vehicle the profile strand 4 must be cured. It is, therefore, appropriately applied to the glass plate 1 in the factory of the glass supplier, or during a subsequent completion process.

For fixing the glass plate 1 provided with the profile frame 4 to the vehicle body, the glass plate 1 is provided on the surface 2 for instance in the area between the profile frame 4 and the circumferential edge 3 with an assembly adhesive strand 10. The thus prepared glass plate 1 is then pressed from the interior of the vehicle with the adhesive strand 10 against the mounting flange 8. As a result of its rubber-elastic characteristics, the profile frame 4 penetrates along the edge 7 of the mounting flange 8 through the window opening in the body, so that the locking groove 6 forms a frictional and interlocking connection with the edge 7 of the mounting flange 8. Therefore, the glass plate 1 is fixed in position and the adhesive strand 10 can now completely harden.

In the embodiment shown in FIG. 2 the window is once again formed by a monolithic safety glass plate 12. The border of the glass plate 12 is surrounded by a cross-sectionally U-shaped profile frame 13 made from a cured polymer. Manufacture of glass plates surrounded with a U-profile frame is by injection moulding, use being more particularly made of two-component polyurethane systems or PVC compositions for the profile frame.

On the outwardly directed side of the glass plate, the frame profile 13 is provided with a profile section 14, which projects into the window opening and cooperates with the edge 15 of the mounting flange 16, which in turn has a locking groove 17, in which engages the mounting flange edge 15. The profile section 14 is also provided with a lip 18, which engages over the mounting flange 16. The assembly adhesive strand is located between the mounting flange 16 and the leg 20 of the profile frame 13, which on the side facing the flange 16 still has a projection web 21. The latter serves as a boundary web for the adhesive material of the adhesive strand 19.

An embodiment with a special laminated safety glass plate 24 is shown on FIG. 3. In this case, the single glass plate 25 facing the vehicle interior has larger surface dimensions than the single glass plate 26 directed towards the outside, so that the laminated glass plate has a stepped marginal construction. On the projecting marginal area of the inner single glass plate 25 is positioned the elastomer profile frame 28, e.g. by bonding on or by extruding on using the extrusion process. The profile frame 28 is tightly connected to the circumferential surface 29 of the smaller, outwardly directed single glass plate 26 and covers the latter with a lip 30. The profile frame 28 is provided with a further lip 31, which covers the bent end region 32 of the mounting flange 33. The boundary web 34 of the profile frame 28 once again ensures that the adhesive material of the assembly adhesive strand 35 does not extend beyond the start of the plate.

The examples given above and the figures deal with a profile frame located at some distance from the glass edge which allows the adhesive strand to be deposited in all cases between the frame and the glass edge. Alternatively, the profile frame may be located near the glass edge and the adhesive strand along its side looking toward the middle of the glazing.

Figure 4:
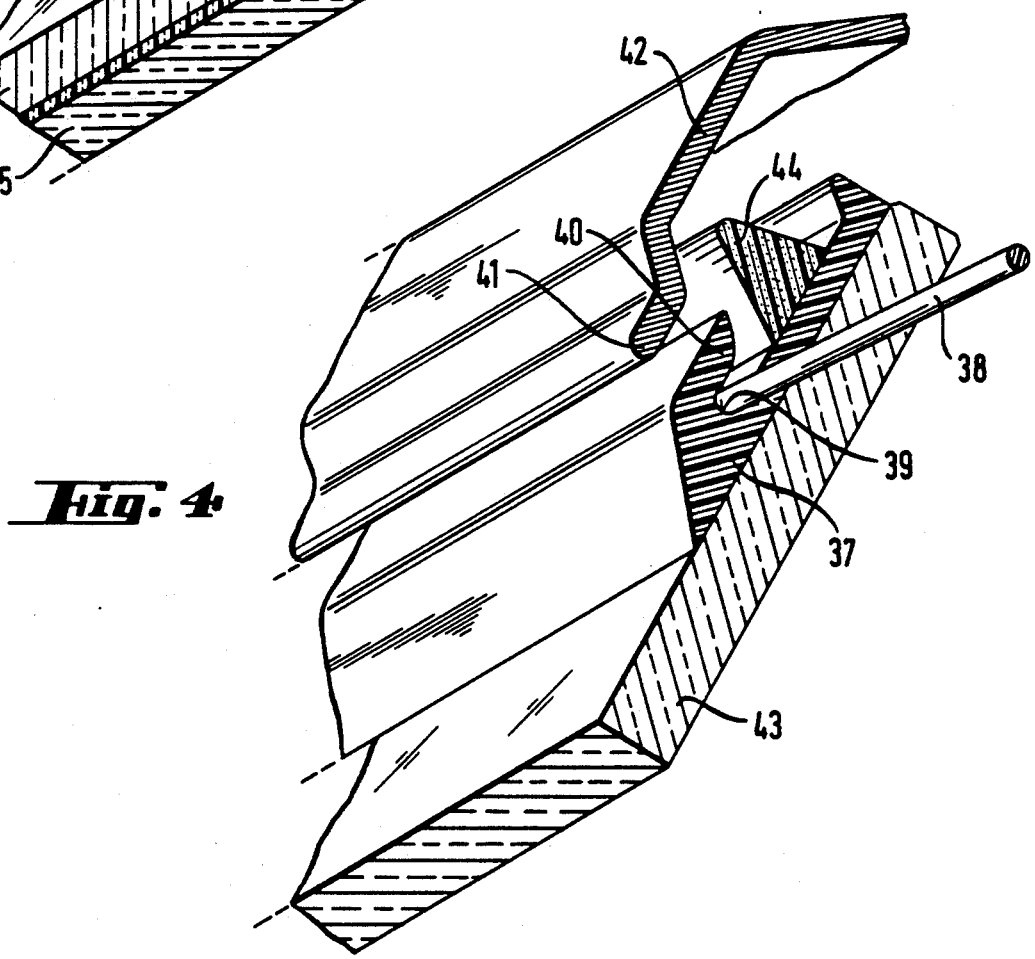
FIG. 4 A glass plate with a profile frame adhering on one side to said plate and having an additional fitting cord.

In order to facilitate the fitting of a glass plate, as described in the embodiments, it is possible to insert a thread or cord in the assembly groove 39 of the profile frame 37, as shown in FIG. 4. The assembly thread 38, which is located in the groove 39 below the lip 40, serves to draw the lip 40 over the bent end region 41 of the mounting flange 42, if the glass plate 43, previously provided with the assembly adhesive strand 44, is pressed against the mounting web 42.

We claim:

1. Vehicle window with a mounting flange forming part of a window frame of a vehicle body and a glass plate bonded to the mounting flange, having a free edge, by means of an adhesive strand and which is provided with a polymer frame or frame-like profile strand having a part cooperating with the mounting flange, characterized in that the part of the polymer frame or the frame-like profile strand (4, 13, 28, 37) cooperating with the mounting flange (8, 16, 33, 42) and the adhesive strand (10, 19, 35, 44) are located on the surface of the glass plate (1, 12, 24, 43) directed towards the vehicle body exterior and the glass plate (1, 12, 24, 43) is bonded to the mounting flange (8, 16, 33, 42) on the side of the latter directed towards the vehicle interior, the adhesive strand (10, 19, 35, 44) being located on the side of the profile strand (4, 13, 28, 37) cooperating with the mounting flange (8, 16, 33, 42).

2. Vehicle window according to claim 1, characterized in that the part of the polymer frame or the frame-like profile strand (4) cooperating with the mounting flange (8) has a locking groove (6) cooperating with the free edge (7) of the mounting flange (8).

3. Vehicle window according to claim 1, characterized in that the polymer frame or frame-like profile strand (13, 28, 37) cooperating with the mounting flange (16, 33, 42) has a lip (18, 31, 40) engaging over an exterior surface of the mounting flange (16, 33, 42).

4. Vehicle window according to claim 1, characterized in that the polymer frame (13) or the frame-like profile strand has a U-shaped cross-section engaging over a marginal area (12) of the glass plate.

5. Vehicle window according to claim 4, characterized in that the frame polymer (13) engaging over the marginal area of the glass plate (12) is produced by the injection mounting process by injection moulding directly onto the glass plate (12).

6. Vehicle window according to claim 1, characterized in that the polymer frame or the framelike profile strand (4, 28, 37) is produced by the extrusion of an extrudable polymer adhering directly on said glass surface.

7. Vehicle window according to claim 1, characterized in that the polymer frame or frame-like profile strand (13, 26, 37) is provided in the area adjacent to the circumferential surface of the glass plate (12, 25, 43) with a boundary web (21, 34) for the assembly of the adhesive strand (19, 35) directed on the mounting flange (16, 33).

8. Vehicle window according to claim 1, characterized in that the glass plate (24) is a laminated glass plate (25, 26) with a stepped edge construction having a first plate (26) with the smaller dimensions directed towards the vehicle exterior and an inner second plate (25) with a marginal area projecting beyond the first plate; and the polymer frame or profile strand (28) is located on the projecting marginal area of the inner plate (25).

9. Vehicle window according to claim 1, characterized in that a cord (38) is positioned in a groove (39) cooperating with an edge region (41) of the glass plate (43).

10. Vehicle window according to claim 1, characterized in that the glass plate is an laminated plastic sheeted glazing and in that the adhesion occurs between the outermost surface of the glazing and the mounting flange.

* * * * *